United States Patent [19]

Sato et al.

[11] Patent Number: 5,083,075
[45] Date of Patent: Jan. 21, 1992

[54] ELECTROMAGNETICALLY OPERATED CONTROL SYSTEM

[75] Inventors: Makoto Sato; Hiromi Inagaki, both of Saitama, Japan

[73] Assignee: Honda Giken Kogyo Kabushiki Kaisha, Tokyo, Japan

[21] Appl. No.: 456,694

[22] Filed: Dec. 26, 1989

[30] Foreign Application Priority Data

Dec. 27, 1988 [JP] Japan ................... 63-329708
Dec. 27, 1988 [JP] Japan ................... 63-329709

[51] Int. Cl.⁵ .................... B60T 8/04; B60T 8/88
[52] U.S. Cl. .................... 318/640; 318/632; 364/426.02; 303/92; 303/95; 303/119 R; 361/92
[58] Field of Search .......... 318/640, 632; 303/20, 303/22.1, 10, 11, 68, 84.1, 92-119, DIG. 4; 188/181 C, 181 R, 106 R, 138, 71.8, 3 R, 171, 196 BA, 313, 345, 358, 76, 54.1, 346, 112 R; 361/92, 161-169; 364/426.02

[56] References Cited

U.S. PATENT DOCUMENTS

| 4,523,791 | 6/1985 | Belart et al. | 303/92 |
| 4,523,792 | 6/1985 | Belart et al. | 303/92 |
| 4,647,114 | 3/1987 | Schuett et al. | 303/92 |
| 4,661,910 | 4/1987 | Reinecke et al. | 361/92 X |
| 4,722,576 | 2/1988 | Matsuda | 303/119 X |
| 4,728,155 | 3/1988 | Resch | 303/10 X |
| 4,755,008 | 7/1988 | Imoto et al. | 303/119 X |
| 4,762,376 | 8/1988 | Matsubara | 303/119 X |
| 4,824,183 | 4/1989 | Uchida et al. | 303/119 X |
| 4,940,291 | 7/1990 | Sato | 303/119 X |
| 4,962,971 | 10/1990 | Miyake | 303/119 X |
| 4,980,832 | 12/1990 | Matsuda | 303/95 X |

Primary Examiner—Paul Ip
Attorney, Agent, or Firm—Armstrong, Nikaido, Marmelstein, Kubovcik & Murray

[57] ABSTRACT

An electromagnetically operated control system includes an actuator having an electromagnetic solenoid which exerts an electromagnetic force of the magnitude corresponding to the amount of electricity input to the solenoid, and a control circuit for controlling the amount of input electricity. The solenoid includes a pair of coils and the control circuit is changed over between a plurality of states including one state in which half of the amount of input electricity is applied to both coils, respectively, and another state in which upon a failure in either one of the coils the whole amount of input electricity is applied to the other coil. This control circuit assures a normal level of electromagnetic force, even upon a failure in one of the coils, with use of the normal one coil which is then applied with the whole of input electricity.

4 Claims, 6 Drawing Sheets

(a) OSCILLATION SIGNAL (b) CURRENT SETTING SIGNAL (c) 1/2 CURRENT SETTING SIGNAL (d) DUTY-CYCLE CONVERSION SIGNAL (e) TROUBLE DIAGNOSING CURRENT

FIG.5

ELECTROMAGNETICALLY OPERATED CONTROL SYSTEM

BACKGROUND OF THE INVENTION

1. Field of the Invention

The field of the present invention is electromagnetically operated control systems of the type having an actuator means which is provided with an electromagnetic solenoid capable of exerting an electromagnetic force of the magnitude corresponding to the amount of electricity input to the solenoid, and a control circuit for controlling the amount of input electricity.

2. Description of the Prior Art

In a conventional system of the mentioned type, the electromagnetic solenoid generally has a single coil and the operation of the actuator means is controlled by controlling the amount of electricity input to the coil.

Such a conventional system, however, suffers from a problem that when the coil of the electromagnetic solenoid has a problem, the actuator means is difficult to be operated and therefore it is required to enhance the operational reliability of the coil which forms the electromagnetic solenoid, unavoidably leading to an increase in cost for assuring such reliability.

SUMMARY OF THE INVENTION

The invention has been proposed in view of the above circumstances and has as one object thereof the provision of an electromagnetically operated control system which is constructed while previously taking possible failure of a coil into account and hence does not require an enhancement in the reliability of the coil to such an extent as desired in conventional systems.

In order to achieve the above object, the invention provides an electromagnetically operated control system comprising an actuator having an electromagnetic solenoid which exerts an electromagnetic force of the magnitude corresponding to the amount of electricity input to the solenoid, and a control circuit for controlling the amount of input electricity, wherein the electromagnetic solenoid includes a pair of coils and the control circuit is constructed to be changed over between a plurality of states including one state where halves of the amount of input electricity are applied to respective coils and another one where upon failure of either one state of the coils the whole amount of input electricity is applied to the other coil. With this arrangement, even if one of the coils of the electromagnetic solenoid has a problem, the other coil is applied with the whole amount of input electricity thus making it possible to obtain a normal level of electromagnetic force through the operation of the single coil.

The afore-mentioned and any other objects, features and advantages of the invention will be apparent from the following description of some preferred embodiments taken in conjunction with the accompanying drawings.

BRIEF DESCRIPTION OF THE DRAWINGS

FIGS. 1-4 show a first embodiment according to the present invention, wherein

DESCRIPTION OF PREFERRED EMBODIMENTS

Descriptions will hereinafter be made on some embodiments in which the present invention is applied to brake control systems for use with a front-engine, front-drive type vehicle.

Figure 1:
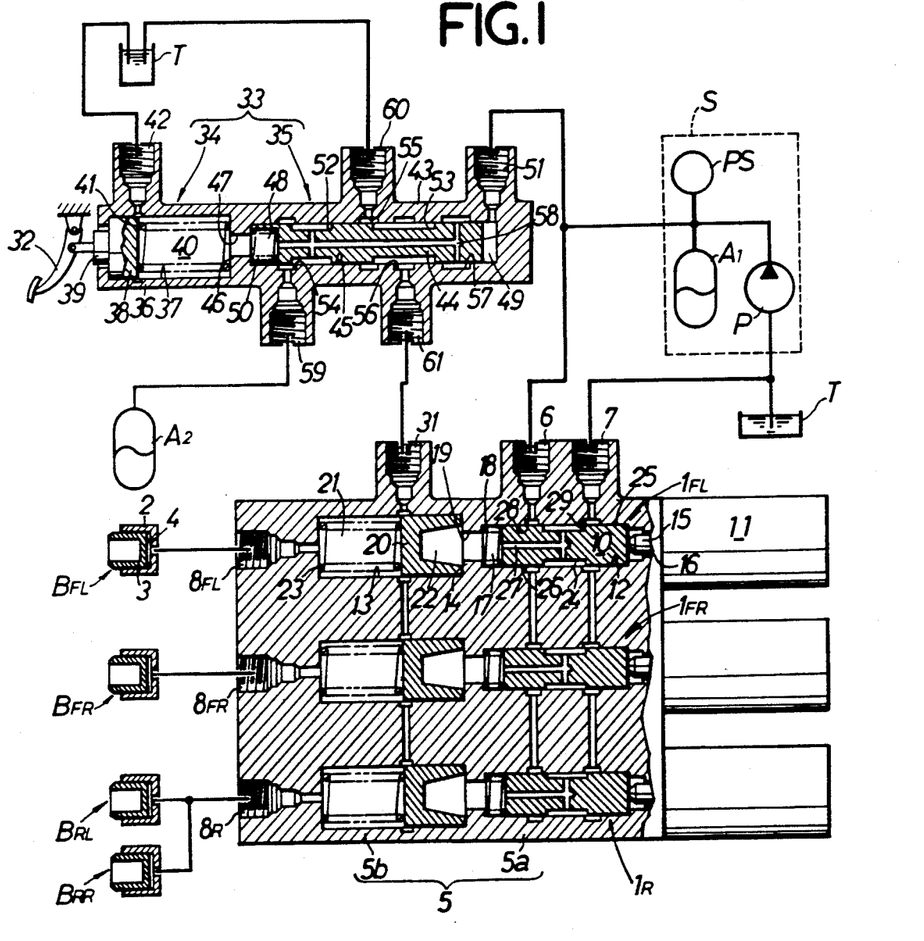
FIG. 1 is a view showing a hydraulic pressure control circuit.

A first embodiment according to the invention will first be described with reference to FIGS. 1 to 4. In FIG. 1, a left front wheel brake device $B_{FL}$ and a right front wheel brake device $B_{FR}$ are respectively applied to a left front wheel and a right front wheel of a vehicle, and modulators $1_{FL}$ and $1_{FR}$ each serving as an actuator means are interposed between one brake device $B_{FL}$ and a hydraulic pressure supply source S as well as a hydraulic fluid tank T, and between the other brake device $B_{FR}$ and the source S and tank T, respectively. A left rear wheel brake device $B_{RL}$ and a right rear wheel brake device $B_{RR}$ are respectively applied to a left rear wheel and a right rear wheel of the vehicle, and a modulator $1_R$ is interposed between both the rear wheel brake devices and the source S and tank T, which modulator $1_R$ serves as a common actuator means for the rear wheel brake devices $B_{RL}$ and $B_{RR}$. Through operations of these modulators $1_{FL}$, $1_{FR}$ and $1_R$, hydraulic brake pressure is supplied to respective brake devices $B_{FL}$, $B_{FR}$, $B_{RL}$ and $B_{RR}$.

Each of the brake devices $B_{FL}$, $B_{FR}$, $B_{RL}$ and $B_{RR}$ includes a cylinder 2 and a piston 3 which is fitted slidably into the cylinder 2 to define therebetween a hydraulic brake pressure chamber 4. The brake device generates a braking force by a displacement of the piston 3 which responds to the supply of hydraulic brake pressure into the hydraulic brake pressure chamber 4.

The hydraulic pressure supply source S comprises a hydraulic pump P which pumps a hydraulic fluid up from the hydraulic fluid tank T, an accumulator $A_1$ connected to the hydraulic pump P and a pressure switch PS for controlling the operation of the hydraulic pump P.

The modulators $1_{FL}$, $1_{FR}$ and $1_R$ are disposed parallel to each other in a common housing 5 and these modulators have a basically identical construction. Hence, the construction of only one modulator $1_{FL}$ will be described in detail hereinafter and any detailed description of the other modulators $1_{FR}$ and $1_R$ are omitted.

The housing 5 is provided with a single input port 6 leading to the hydraulic pressure supply source S, a single release port 7 leading to the hydraulic fluid tank T, and three output ports $8_{FL}$, $8_{FR}$ and $8_R$ leading to the respective brake hydraulic chambers 4, wherein the output ports $8_{FL}$ and $8_{FR}$ are provided for the corresponding front wheel brake devices $B_{FL}$ and $B_{FR}$, respectively, and the remaining one output port $8_R$ is provided commonly for the rear wheel brake devices $B_{RL}$ and $B_{RR}$.

The modulator $1_{FL}$ comprises a spool 10 slidably fitted in the housing 5 and a linear solenoid 11 serving as an electromagnetic solenoid which is mounted on the housing 5 in order to axially push the spool 10. The linear solenoid 11 is operatively connected to one of opposite end portions of the spool 10 and the other end portion of the spool 10 faces a hydraulic control pressure generating chamber 17. The spool 10 is adapted to change over between a state communicating the hydraulic control pressure generating chamber 17 with the input port 6 leading to the hydraulic pressure supply source S and a state communicating the chamber 17 with the release port 7, by changing its axial position dependent on the counteracting relations between a thrust force of the linear solenoid 11 acting on the one axial end of the spool and a hydraulic force within the hydraulic control pressure generating chamber 17 acting on the other axial end of the spool.

The housing 5 is formed by integrally connecting a first cylinder body 5a having a first cylinder bore 12 and a second cylinder body 5b having a second cylinder bore 13 with the first and second cylinder bores 12 and 13 being disposed in a coaxial relation. A partition wall 14 is provided at the connected portion between the cylinder bodies 5a and 5b to separate the first and second cylinder bores 12 and 13. The spool 10 is slidably fitted in the first cylinder bore 12. The linear solenoid 11 is mounted on one outside surface of the housing 5 (right-hand in FIG. 1) and a drive rod 15 of this solenoid 11 is inserted coaxially into the first cylinder bore 12 through an insertion hole 16 which is formed in the housing 5 in communication with one end of the cylinder bore 12. The hydraulic control pressure generating chamber 17 is defined between the other end portion of the spool 10 and the partition wall 14 and in this chamber 17 is accommodated a return spring 18 which urges the spool 10 toward its one axial end side or the side of the linear solenoid 11. Thus, the drive rod 15 is always placed in abutment against the one end portion of the spool 10, thereby providing an operative connection between the spool 10 and the linear solenoid 11.

A free piston 20 is fitted slidably into the second cylinder bore 13. Between this free piston 20 and the housing 5 are defined an output chamber 21 leading to the output port $8_{FL}$ and a back pressure chamber 22 which communicates with the hydraulic control pressure generating chamber 17 via a communication hole 19 formed through the partition wall 14. A return spring 23 is housed in the output chamber 21 for urging the free piston 20 toward the partition wall 14. When a hydraulic pressure is generated in the hydraulic control pressure generating chamber 17 in response to an operation of the linear solenoid 11, that hydraulic pressure acts on the back of the free piston 20 thereby to cause generation of a hydraulic pressure in the output chamber 21 which is fed through the output port $8_{FL}$ to act in the hydraulic brake pressure chamber 4 of the brake device $B_{FL}$. The partition wall 14 serves also as a stopper for defining the retraction limit position of the free piston 20 toward the back pressure chamber 22.

The spool 10 is provided with lands 25 and 26 and an annular groove 24 defined between the lands. The spool 10 is further provided with a communication passage 27 which beings the annular groove 24 into communication with the hydraulic control pressure generating chamber 17 irrespective of the axial position of the spool 10. The first cylinder bore 12 is formed in its inner surface with an annular recessed portion 28 and an annular recessed portion 29 with an axial spacing therebetween, the annular recessed portion 28 being capable of communicating the input port 6 with the annular groove 24 whereas the annular recessed portion 29 being capable of communicating the release port 7 with the annular groove 24. When the spool 10 is moved leftwardly toward the partition wall 14 to assume a hydraulic pressure supply position at which the annular recessed portion 28 is communicated with the annular groove 24, the annular recessed portion 29 is closed by the land 25. On the other hand, when the spool 10 is moved rightwardly from the hydraulic pressure supply position to assume a hydraulic pressure release position at which the annular recessed portion 29 is communicated with the annular groove 24, the annular recessed portion 28 is closed by the land 26. At a position intermediate between the hydraulic pressure supply position and the hydraulic pressure release position, both the annular recessed portions 28 and 29 are closed by the lands 26 and 25, respectively.

In other words, the spool 10 is displaceable in the axial direction between the hydraulic pressure supply position at which the back pressure chamber 22 defined at the back of the free piston 20 is supplied with hydraulic pressure from the hydraulic pressure supply source S by bringing the annular groove 24, which is communicated with the back pressure chamber 22 via the communication hole 19, hydraulic control pressure generating chamber 17 and communication passage 27, into communication with the annular recessed portion 28, and the hydraulic pressure release position at which the back pressure chamber 22 is communicated with the hydraulic fluid tank T by the annular groove 24 being brought into communication with the release port 7. The pushing force of the linear solenoid 11 acting on the one axial end of the spool 10 works to urge the spool toward the hydraulic pressure supply position and the hydraulic force, which acts on the other axial end of the spool 10 and is caused by the hydraulic pressure within the hydraulic control pressure generating chamber 17, works to urge the spool toward the hydraulic pressure release position.

The free piston 20 is retracted to its limit of retraction abutting against the partition wall 14 when the back pressure chamber 22 at the back of the piston 20 is released outside. An auxiliary input port 31 is formed in the housing 5 so as to be communicated with the output chamber 21 when the free piston 20 is at its limit of retraction. The auxiliary input port 31 is used to permit such a level of hydraulic brake pressure as corresponding to the amount of depression of a brake pedal 32 to be supplied into the afore-mentioned output chamber 21 upon failure of the hydraulic pressure supply source S. An auxiliary output port 61 of an auxiliary hydraulic pressure supply means 33 is connected to the auxiliary input port 31.input port 31.

The auxiliary hydraulic pressure supply means 33 comprises a hydraulic brake pressure generating part 34 which is capable of generating a hydraulic brake pressure of the magnitude corresponding to the amount of depression of the brake pedal 32, and a change-over valve part 35 which is operated in a switched manner upon failure of the hydraulic pressure supply source S to supply the hydraulic brake pressure generated at the hydraulic brake pressure generating part 34 into the output chamber 21 of the modulator $1_{FL}$.

The hydraulic brake pressure generating part 34 is formed by slidably fitting a piston 38 in a third cylinder bore 37 which is provided in a cylinder body 36 and the brake pedal 32 is coupled to the piston 38 via a load cell 39. A reaction chamber 40 is defined between the cylinder body 36 and the piston 38 at a position opposite the brake pedal 32 and in this reaction chamber 40 is accommodated a spring 41 which urges the piston 38 in a direction of increasing the volume of the reaction chamber 40. The cylinder body 36 is further formed with a port 42 which is communicated with the hydraulic fluid tank T and is also placed in communication with the reaction chamber 40 when the volume of the chamber 40 becomes largest, that is, when the piston 38 has moved leftwardly to a maximum without the brake pedal 32 being depressed down.

The change-over valve part 35 is formed by slidably fitting a spool valve body 44 in a main body 43 and the main body 43 is integrally and coaxially connected with the cylinder body 36 of the hydraulic brake pressure generating part 34. The main body 43 is formed therein with a fourth cylinder bore 45 which is coaxial with the third cylinder bore 37 and the spool valve body 44 is slidably fitted in the fourth cylinder bore 45. A partition wall 46 is provided at a connected part between the cylinder body 36 and the main body 43 for separating the third and fourth cylinder bores 37 and 45 from each other and a communication hole 47 is formed through the partition wall 46 at a location coaxial with the third and fourth cylinder bores 37 and 45.

A spring chamber 48 is defined between the spool valve body 44 and the partition wall 46 and a hydraulic pressure source hydraulic chamber 49 is defined between the spool valve body 44 and that end wall of the fourth cylinder bore 45 which is opposite the partition wall 46. The spring chamber 48 is communicated with the reaction chamber 40 via the communication hole 47 and in this spring chamber 48 is accommodated a spring 50 which urges the spool valve body 44 in a direction of increasing the volume of the spring chamber 48.

The main body 43 is formed with a hydraulic pressure supply port 51 leading to the hydraulic pressure source hydraulic chamber 49 and this port 51 is connected to the hydraulic pressure supply source S. Accordingly, the hydraulic pressure source hydraulic chamber 49 is supplied with the operation fluid from the hydraulic pressure supply source S to permit the hydraulic force caused by the hydraulic pressure from the source S to act on the spool valve body 44 leftwardly whereas the spring force of the spring 50 and the hydraulic force caused by the hydraulic pressure generated in the reaction chamber 40 act on the body 44 rightwardly. As long as the hydraulic pressure supply source S operates in a normal manner, the spool valve body 44 is moved leftwardly and abutted against the partition wall 46 and when the hydraulic pressure supply source S falls into trouble and the level of hydraulic pressure in the hydraulic pressure source hydraulic chamber 49 lowers, the spool valve body 44 is moved apart from the partition wall 46 to the right.

On the outer surface of the spool valve body 44 there are provided an annular groove 52 close to the spring chamber 48 and an annular groove 53 close to the hydraulic pressure source hydraulic chamber 49 with an axial spacing therebetween. On the inner surface of the fourth cylinder bore 45 there are provided annular recessed portions 54, 55, 56 and 57 sequentially in the mentioned order from the side of the spring chamber 48 with spacings between respective recessed portions. Furthermore, these annular recessed portions are arranged such that the recessed portion 54 is communicated with the annular groove 52 only at the left-moved position of the spool valve body 44; the recessed portion 55 is communicated with the annular groove 53 only at the left-moved position of the spool valve body 44; the recessed portion 56 is communicated at all times with the annular groove 53 irrespective of the axial position of the spool valve body 44; and the recessed portion 57 is in communication with the annular groove 53 only at the right-moved position of the spool valve body 44. The spool valve body 44 is further provided with a hydraulic fluid passage 58 which is connected to the reaction chamber 40 via the spring chamber 48 and this passage 58 opens to the annular groove 52 as well as to the outer surface of the spool valve body 44 at a location close to the hydraulic pressure source hydraulic chamber 49 for permanent communication with the annular recessed portion 57.

The main body 43 of the change-over valve part 35 is formed with a port 59 leading to the annular recessed portion 54, a release port 60 leading to the annular recessed portion 55 and the afore-mentioned auxiliary output port 61 leading to the annular recessed portion 56. Moreover, it is arranged that the port 59 is communicated with an accumulator $A_2$, the release port 60 is communicated with the hydraulic fluid tank T, and the auxiliary output port 61 is communicated with the auxiliary input port 31.

In the auxiliary hydraulic pressure supply means 33 thus constructed, when the hydraulic pressure from the hydraulic pressure supply source S acts in the hydraulic pressure source hydraulic chamber 49, the spool valve body 44 is at the left-moved position and in this state the reaction chamber 40 is placed in communication with the accumulator $A_2$ via the spring chamber 48, hydraulic fluid passage 58, annular groove 52, annular recessed portion 54 and the port 59. Also in this state the auxiliary output port 61 and the release port 60 are communicated with each other through the annular recessed portion 56, annular groove 53 and the annular recessed portion 55. If the hydraulic pressure in the hydraulic pressure source hydraulic chamber 49 were reduced in level, the spool valve body 44 assumes the right-moved position at which the reaction chamber 40 is brought into communication with the auxiliary input port 31 through the spring chamber 48, hydraulic fluid passage 58, annular recessed portion 57, annular groove 53, annular recessed portion 56 and the auxiliary output port 61.

Figure 2:
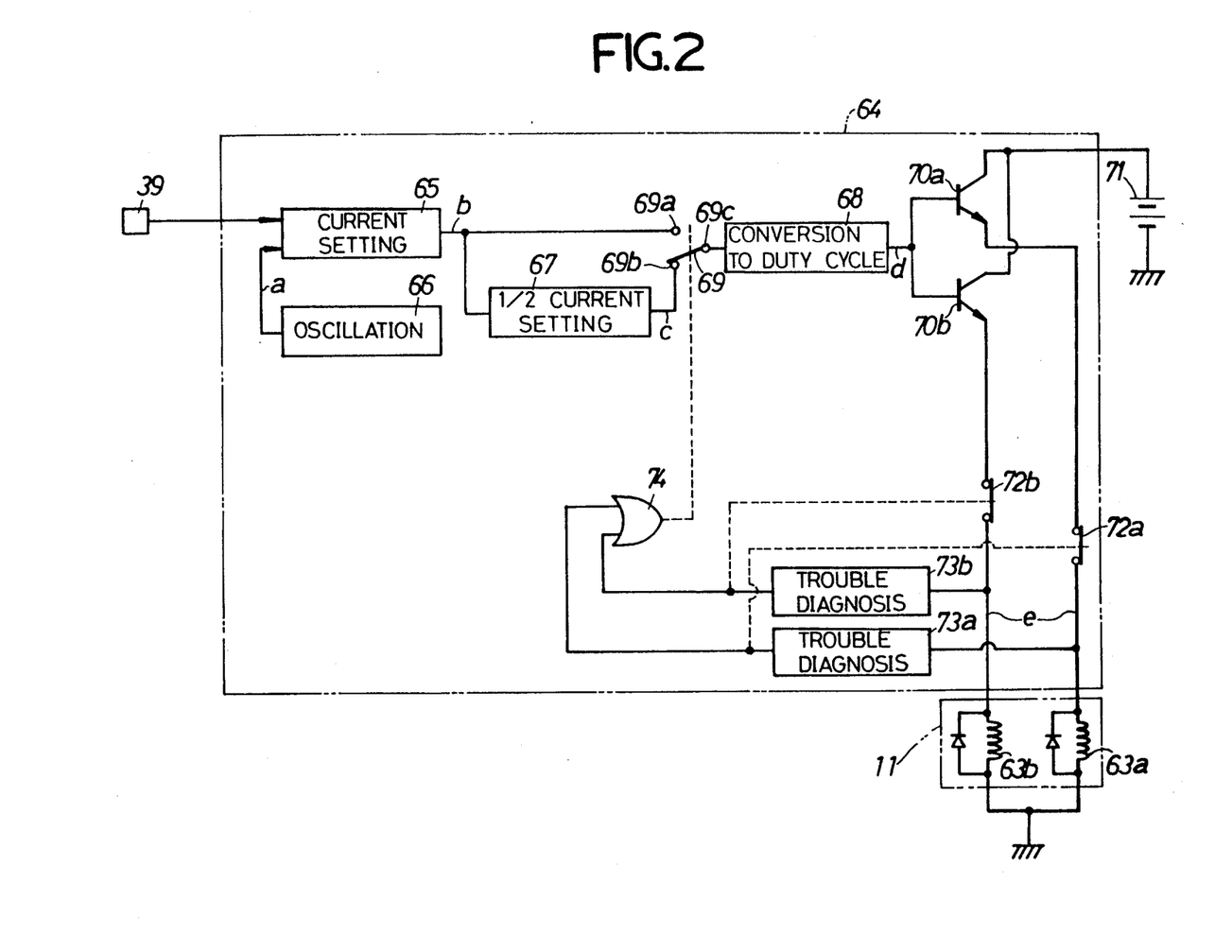
FIG. 2 is a view showing a control circuit system for an electromagnetic solenoid.
Figure 3:
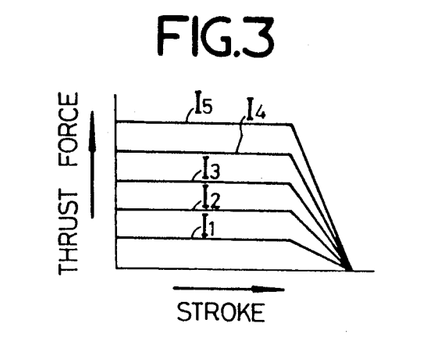
FIG. 3 is a view showing characteristic curves of the electromagnetic solenoid and FIG. 4 shows timing charts of signals appearing at respective parts of the control circuit system during non-braking operation with coils operating normally.

As shown in FIG. 2, the linear solenoid 11 of the modulator $1_{FL}$ has a pair of coils 63a and 63b and generates a thrust force of the magnitude corresponding to the total amount of electricity input to the coils 63a and 63b. More specifically, the linear solenoid 11 generates a thrust force of the magnitude which corresponds to the total amount $I_1$-$I_5$ of exciting current in the coils 63a, 63b or to the voltage with a constant resistance, as shown in FIG. 3. In a certain range of stroke the thrust force F generated at the linear solenoid 11 is represented by the following equation:

$$F = K \cdot I$$

wherein I is the total amount of exciting current and K is a constant. Further provided that Pw is the hydraulic pressure in the hydraulic control pressure generating chamber 17 and Sc is the pressure receiving area of the spool 10 as exposed to the hydraulic control pressure generating chamber 17, the hydraulic force f acting on the spool 10 will be indicated by the equation: $f = Sc \cdot Pw$. Accordingly, when $F = K \cdot I > Sc \cdot Pw$, the spool 10 moves toward the hydraulic pressure supply position on the left side, whereas when $F = K \cdot I < Sc \cdot Pw$, the spool 10 moves toward the hydraulic pressure release position on the right side.

Thus, through axial displacements of the spool 10 dependent on counteracting relations between the thrust force F and the hydraulic force f, the operation fluid is supplied into the hydraulic control pressure generating chamber 17 from the hydraulic pressure supply source S or the hydraulic pressure in the chamber 17 is released to the outside, whereby the hydraulic pressure Pw will be given by the following equation:

$$Pw = (K/Sc) \cdot I \qquad (1)$$

That is, the hydraulic pressure Pw is proportionate to the current I supplied to the linear solenoid 11 and this means that the hydraulic pressure Pw in the hydraulic control pressure generating chamber 17 can be controlled in a desired manner by the current supply to the linear solenoid 11. The hydraulic brake pressure of such a level as corresponding to the hydraulic pressure Pw prevailing in the hydraulic control pressure generating chamber 17 can be generated in the hydraulic brake pressure chamber 4 of the brake device $B_{FL}$.

It should be noted here that the current supply to both the coils 63a and 63b of the linear solenoid 11 is controlled by a control circuit system 64 and this control circuit system 64 is constructed such that it is changed over between a state wherein halves of the current corresponding to the amount of braking operation detected by the load cell 39 are converted into duty cycles and are applied to both the coils 63a, 63b, and a state wherein upon failure of one of the coils 63a, 63b, the whole amount of the current corresponding to the amount of braking operation is converted into duty cycles and is applied to the other of the coils 63a, 63b.

The control circuit system 64 comprises a current setting circuit 65 for setting the amount of current given to both the coils 63a, 63b in response to a signal from the load cell 39; an oscillator circuit 66 for inputting an oscillation signal to the current setting circuit 65 for diagnosing any failure or trouble in the coils 63a, 63b; a ½ current setting circuit 67 for setting one half of the current which has been set in the current setting circuit 65; a duty-cycle conversion circuit 68 for converting the amount of current set into duty cycles; a switch 69 for alternatively connecting the current setting circuit 65 and the ½ current setting circuit 67 to the duty-cycle conversion circuit 68; a pair of transistors 70a and 70b having their base terminals connected in parallel to the duty-cycle conversion circuit 68 and their collector terminals connected in parallel to an electric-power source 71; switches 72a and 72b interposed between emitter terminals of the transistors 70a, 70b and the coils 63a, 63b, respectively; trouble diagnosing circuits 73a and 73b for diagnosing troubles in the coils 63a and 63b, respectively; and an OR gate 74 connected to both the trouble diagnosing circuits 73a, 73b for changing the switching mode of the switch 69.

Figure 4:
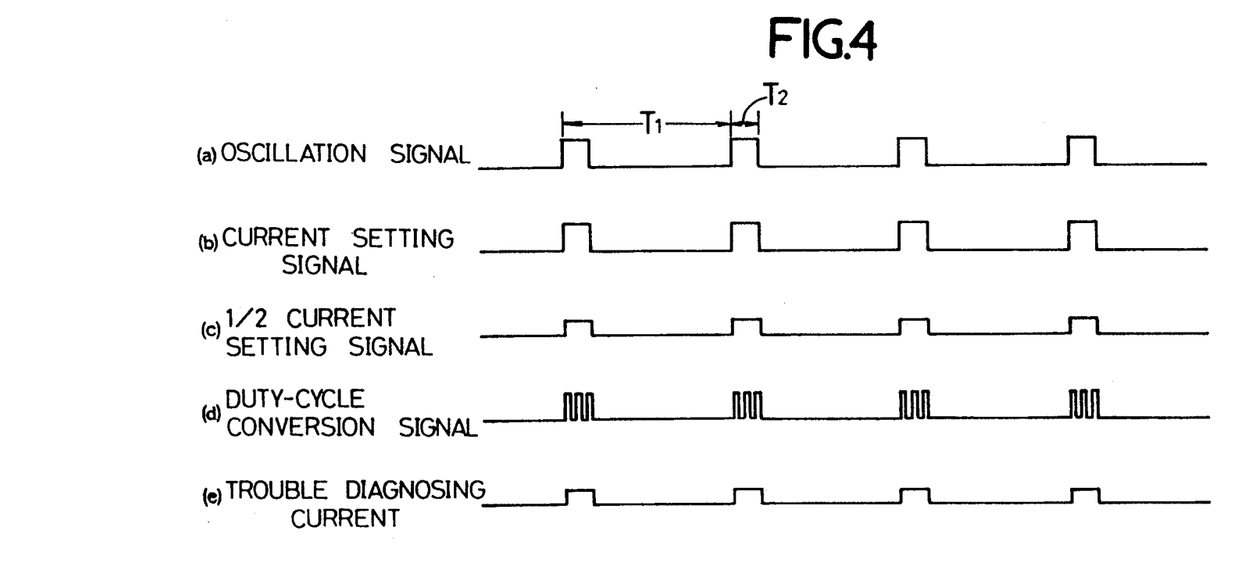

The oscillator circuit 66 is constructed to output a pulse of time width T2 on a cycle of certain duration T1, for example, of 1 second, as shown in FIG. 4(a) and the time width T2 is set to be short enough to have no effect on the operation of the linear solenoid 11, for example, at 1 msec. The current setting circuit 65 is constructed to superpose an oscillation signal given from the oscillator circuit 66 on a set current which corresponds to a signal indicative of the amount of braking operation given from the load cell 39, and then output a signal. The output signal of the current setting circuit 65 has such a form as shown in FIG. 4(b) when a braking operation is not performed. The ½ current setting circuit 67 is constructed to reset the set current to one half level on the basis of an input signal from the current setting circuit 65 and when no braking operation is carried out, the output of the ½ current setting circuit 67 assumes the form shown in FIG. 4(c).

The switch 69 comprises a separate contact 69a connected to the current setting circuit 65, a separate contact 69b connected to the ½ current setting circuit 67 and a common contact 69c connected to the duty-cycle conversion circuit 68, and this switch 68 changes its switching mode dependently on an output from the OR gate 74. The OR gate 74 is capable of outputting a signal of high level when either one of the coils 63a, 63b is out of order. When this OR gate outputs a signal of low level, the switch 69 assumes a switching mode of connecting the separate contact 69b to the common contact 69c whereas when the output of the OR gate 74 rises to a high level, the switch 69 assumes a switching mode of connecting the separate contact 69a to the common contact 69c.

The duty-cycle conversion circuit 68 is constructed to output a duty-cycle conversion signal which corresponds to a set current signal input to the circuit 68 via the switch 69. When the output of the OR gate 74 assumes a low level, that is, when both the coils 63a, 63b are in order in non-braking condition, the output of the duty-cycle conversion circuit 68 is as shown in FIG. 4(d). In response to the output signal from this duty-cycle conversion circuit 68, the transistors 70a and 70b are conducted and cut off, permitting such a current as shown in FIG. 4(e) to flow in the coils 63a and 63b. This current is not so high enough to actuate the linear solenoid 11 but is intended to be used for trouble diagnosis.

The trouble diagnosing circuits 73a and 73b are connected to respective points between the switch 72a and the coil 63a and between the switch 72b and the coil 63b and these circuits operate such that when the current shown in FIG. 4(e) flows during non-braking, the circuits 73a and 73b determine the condition to be normal and output signals of low level but when the flow of a current other than the one shown in FIG. 4(e) is detected, they determine that a problem is present and output signals of high level, respectively. In other words, it is possible to detect a problem of such kinds that the coils 63a and 63b are disconnected or short-circuited and that the transistor 70a, 70b remains conducted or cut off, since the signals input to the trouble diagnosing circuits 73a and 73b remain low or high in level.

The switches 72a and 72b are opened in response to the outputs of the associated trouble diagnosing circuits 73a and 73b becoming high. Accordingly, when one trouble diagnosing circuit 73a determines the occurrence of a problem and outputs a high level of signal, the switch 72a is opened. When the other trouble diagnosing circuit 73b determines the occurrence of a problem and outputs a high level of signal, the switch 72b is opened.

The outputs of the trouble diagnosing circuits 73a and 73b are fed to input terminals of the OR gate 74 so that the OR gate 74 outputs a high level of signal when the output of either one of the trouble diagnosing circuits 73a and 73b becomes high, that is, when either one of the coils 63a and 63b falls in trouble, thereby changing the switch 69 into the switching mode where the separate contact 69a is connected with the common contact 69c.

Next the operation of this first embodiment will be described. It is first of all assumed that the hydraulic pressure supply source S and the linear solenoid 11 are in normal operation and the brake pedal 32 is depressed down for obtaining a braking action. At this moment, in the auxiliary hydraulic pressure supply means 33, the spool valve body 44 of the change-over valve part 35 has been moved to the left in FIG. 1 since the hydraulic pressure from the hydraulic pressure supply source S is supplied into the hydraulic pressure source hydraulic chamber 49, and the reaction chamber 40 is communicated with the accumulator $A_2$ through the communication hole 47, spring chamber 48, hydraulic fluid passage 58, annular groove 52, annular recessed portion 54 and the port 59. Therefore, an operator receives a reaction force from the accumulator $A_2$ when depressing the brake pedal 32 down to effect a braking operation, thus having a brake operating feeling.

In response to the degree of depression of the brake pedal 32, the hydraulic pressure in the reaction chamber 40 increases and following such increase in the hydraulic pressure the output from the load cell 39 becomes higher. That is, the load cell 39 outputs a signal of the level corresponding to the amount of braking operation. The control circuit system 64 responds to the signal from the load cell 39 to cause an exciting current of the magnitude of one half of the set current corresponding to the amount of braking operation to flow in each of the coils 63a and 63b. Thereby the linear solenoid 11 exhibits a thrust correspondingly to the amount of braking operation and accordingly a hydraulic pressure of the level corresponding to said thrust is generated in the hydraulic control pressure generating chamber 17 of the modulator $1_{FL}$. The hydraulic pressure within the hydraulic control pressure generating chamber 17 acts on the back of the free piston 20 thereby to cause a hydraulic braking pressure of the level corresponding to the amount of braking operation to be generated in the hydraulic brake pressure chamber 4 of the brake device $B_{FL}$.

Thus, a hydraulic pressure can be generated in the hydraulic brake pressure chamber 4 of the brake device $B_{FL}$ in a manner corresponding to the amount of braking operation.

It should be noted that the spool 10 of the modulator $1_{FL}$ displaces at high speeds in the axial direction during braking operation and there is a possibility that the hydraulic control pressure generating chamber 17 may be aerated due to cavitation at the time of displacement of the spool 10 to the right in FIG. 1 at a high speed. Entry of air into the hydraulic brake pressure chamber 4 of the brake device $B_{FL}$ must be avoided and any air which may be generated in the hydraulic control pressure generating chamber 17 due to cavitation can reliably be prevented from entering the hydraulic brake pressure chamber 4 because the free piston 20 is interposed between the hydraulic control pressure generating chamber 17 and the hydraulic brake pressure chamber 4 and the retraction movement of the free piston 20 is limited by the partition wall 14. Moreover, owing to the arrangement that the hydraulic control pressure generating chamber 17 is located in a circulating path extending between the hydraulic pressure supply source S and the hydraulic fluid tank T, any air generated in the hydraulic control pressure generating chamber 17 is discharged to the tank T.

If the hydraulic pressure supply source S fell in trouble and the hydraulic pressure from the source S were reduced in level, it becomes difficult to generate a hydraulic pressure in the hydraulic control pressure generating chamber 17 of the modulator $1_{FL}$. In this case, in the auxiliary hydraulic pressure supply means 33, the hydraulic pressure in the hydraulic pressure source hydraulic chamber 49 is reduced and hence, the spool valve body 44 of the change-over valve part 35 is moved rightwardly in FIG. 1 to place the reaction chamber 40 in communication with the auxiliary input port 31 via the communication hole 47, spring chamber 48, hydraulic fluid passage 58, annular recessed portion 57, annular groove 53, annular recessed portion 56 and the auxiliary output port 61. Moreover, since the free piston 20 is moved at this time to the limit of retraction in response to the hydraulic pressure reduction in the hydraulic control pressure generating chamber 17, the auxiliary input port 31 is communicated with the output chamber 21. As a result, a hydraulic brake pressure is directly fed to the hydraulic brake pressure chamber 4 in response to the depression of the brake pedal 32, thus assuring a desired hydraulic brake pressure in a reliable manner irrespective of occurrence of a failure in the hydraulic pressure supply source S.

In addition, when the afore-mentioned hydraulic pressure supply source S is troubled, the spool valve body 44 in the change-over valve part 35 of the auxiliary hydraulic pressure supply means 33 is displaced rightwardly to cut off the communication of the port 59 leading to the accumulator 40 with the reaction chamber $A_2$, whereby generation of any ineffective stroke at the brake pedal 32 can be avoided.

It is then assumed that either one of the pair of coils 63a and 63b in the linear solenoid 11 is out of order, such as disconnected or short-circuited, or that either one of the transistors 70a and 70b has a problem. In this case, such a problem is detected by the detective diagnosing circuit 73a or 73b and on the basis of this detection the current supply to the troubled one of the coils 63a and 63b is stopped and instead the whole amount of set current corresponding to the amount of braking operation is supplied to the other normal coil. With this arrangement, the linear solenoid 11 can exert a thrust force in correspondence to the amount of braking operation and even if one of the coils 63a, 63b were troubled, the hydraulic brake pressure chamber 4 of the brake device $B_{FL}$ can be supplied with a hydraulic brake pressure of the magnitude corresponding to the amount of braking operation.

Figure 5:
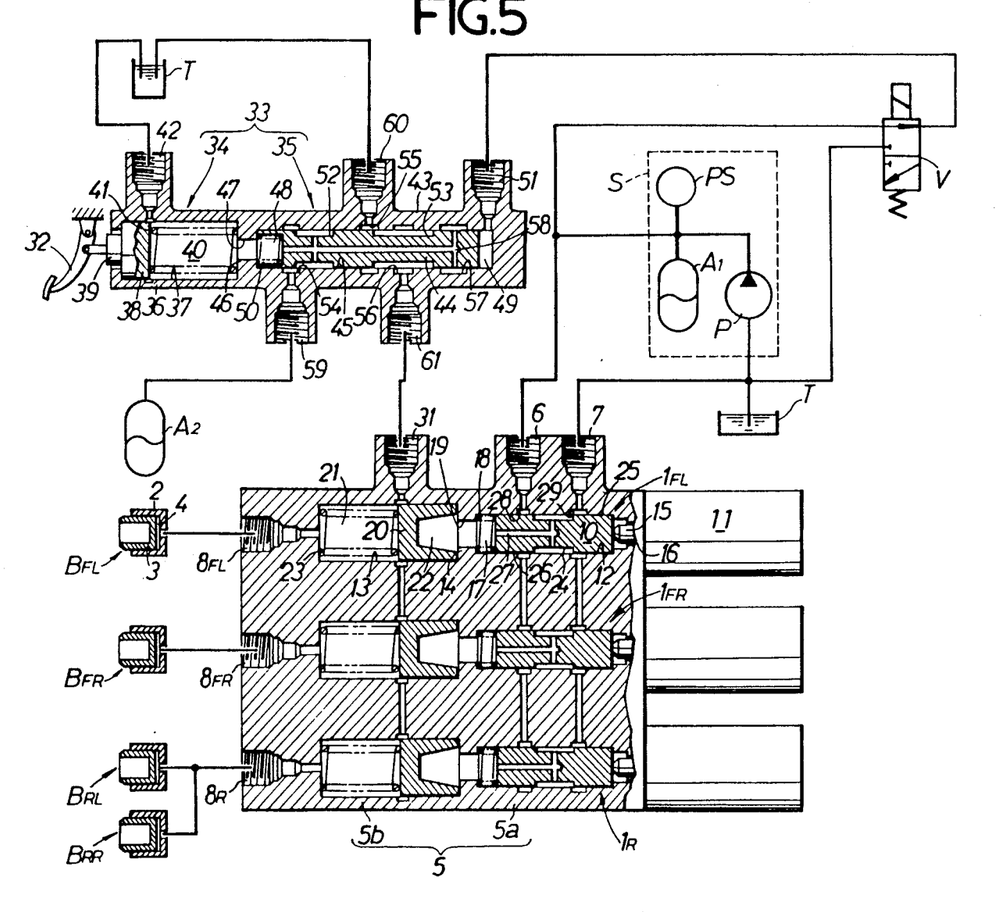
FIGS. 5, 6 and 7 are views showing hydraulic pressure control circuits according to second, third and fourth embodiments of the invention, respectively.

FIG. 5 shows a second embodiment according to the invention and parts thereof corresponding to those of the first embodiment shown in FIGS. 1 to 4 are designated by the same reference numerals and characters.

An electromagnetic change-over valve V is interposed between the hydraulic pressure source port 51 of the auxiliary hydraulic pressure supply means 33 and the hydraulic pressure supply source S and tank T. This electromagnetic change-over valve V can be changed over between a state where it is energized to connect the hydraulic pressure supply port 51 to the hydraulic pressure supply source S and a state where it is deenergized to connect the port 51 to the hydraulic fluid tank T. When the electric system including the linear solenoid 11 operates in a normal condition, the electromagnetic changeover valve V is in an energized state and when that electric system has a problem, the electromagnetic change-over valve V becomes deenergized.

In this second embodiment, when the electric system including the linear solenoid 11 is in trouble, the linear solenoid 11 may operate in a disordered manner. In this case, however, the electromagnetic change-over valve V is deenergized and in the auxiliary hydraulic pressure supply means 33, the hydraulic pressure in the hydraulic pressure source hydraulic chamber 49 of the change-over valve part 35 is reduced to permit the spool valve body 44 of the change-over valve part 35 to move rightwards in FIG. 5 as in the case of occurrence of an abnormal reduction in the hydraulic pressure supplied from the hydraulic pressure supply source S, whereby the reaction chamber 40 is placed in communication with the auxiliary input port 31 through the communication hole 47, spring chamber 48, hydraulic fluid passage 58, annular recessed portion 57, annular groove 53, annular recessed portion 56 and the auxiliary input port 31. Accordingly, the hydraulic brake pressure of the level corresponding to the amount of depression of the brake pedal 32 can directly act in the hydraulic brake pressure chamber 4, enabling a required hydraulic brake pressure to be achieved reliably irrespective of any trouble occurring in the electric system.

Though, in the above-described embodiments, the hydraulic brake pressure is produced on the basis of signals from the load cell 39 only, it is also possible to control the hydraulic brake pressure by operating the linear solenoid 11 on the basis of antilock control signals and traction control signals in addition to the signal indicative of the amount of braking operation given from the load cell 39.

Figure 6:
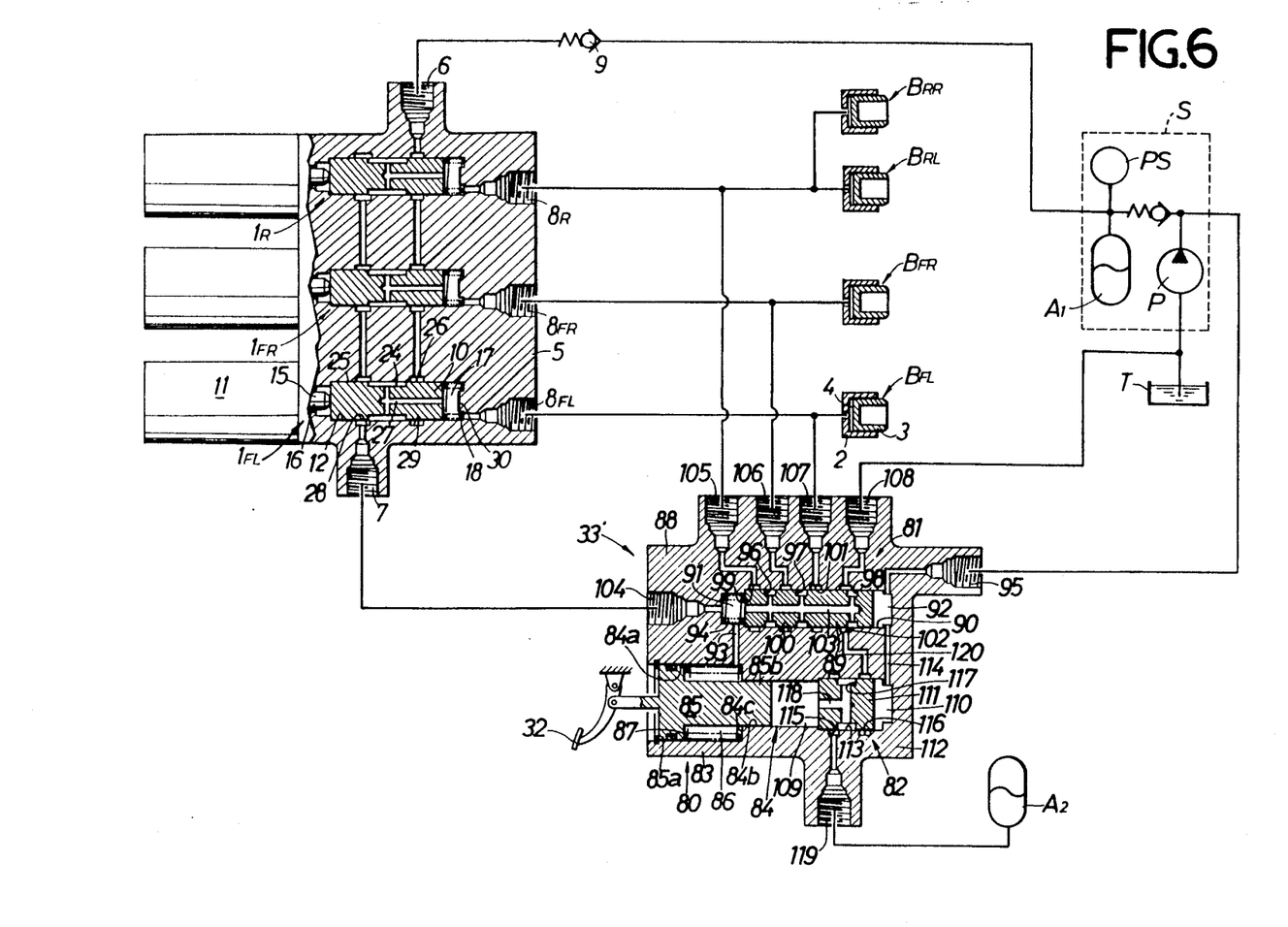

FIG. 6 shows a third embodiment according to the invention and parts thereof corresponding to the first and second embodiments are indicated by the same reference numerals and characters.

Modulators $1_{FL}$, $1_{FR}$ and $1_R$ are disposed in the common housing 5 and the single input port 6 for these modulators is connected to the hydraulic pressure supply source S via a one-way valve 9 which permits the flow of hydraulic fluid only in the direction from the source S to the input port 6. Respective output ports $8_{FL}$, $8_{FR}$ and $8_r$ are connected to the hydraulic brake pressure chambers 4 of the corresponding brake devices $B_{FL}$, $B_{FR}$, $B_{RL}$ and $B_{RR}$. The linear solenoid 11 is mounted to the housing 5 for each of the modulators $1_{FL}$, $1_{FR}$ and $1_R$ and the drive rod 15 of this linear solenoid is placed in direct abutment against one end portion of the spool 10. The other end surface of the spool 10 is exposed to the hydraulic control pressure generating chamber 17 and on the end wall of the cylinder bore 12 facing the chamber 17 there is formed a projection 30 which is capable of abutting against the other end surface of the spool 10 for closing the communication passage 27. Each the output ports $8_{FL}$, $8_{FR}$ and $8_R$ is communicated with the hydraulic control pressure generating chamber 17 at a location not hindered by the projection 30. The projection 30 works such that when a loss in hydraulic pressure occurs in the hydraulic pressure path extending between the hydraulic control pressure generating chamber 17 and the brake device $B_{FL}$, the projection 30 comes into abutment against the other end surface of the spool 10 in response to the spool 10 moving rightwardly to a maximum, thereby blocking the communication passage 27. Due to this arrangement, the loss in hydraulic pressure is prevented from affecting the other modulators $11_{FR}$ and $11_R$, that is, the other brake devices $B_{FR}$, $B_{RL}$ and $B_{RR}$.

An auxiliary hydraulic pressure supply means 33' is connected to the respective brake devices $B_{FL}$, $B_{FR}$, $B_{RL}$ and $B_{RR}$ in a manner parallel to the modulators $1_{FL}$, $1_{FR}$ and $1_R$, respectively, and this means 33' comprises a hydraulic brake pressure generating part 80, a first change-over valve part 81 and a second change-over valve part 82.

The hydraulic brake pressure generating part 80 is formed by slidably fitting a piston 85 into a cylinder bore 84 formed in a cylinder body 83. The piston 85 is connected to the brake pedal 32. A hydraulic brake pressure generating chamber 86 is defined between the cylinder body 83 and the piston 85 on the side of the piston 85 opposite the brake pedal 32 and a spring 87 is accommodated in the hydraulic brake pressure generating chamber 86 for urging the piston 85 in a direction to increase the volume of the chamber 86.

More specifically, the cylinder bore 84 comprises a larger diameter bore portion 84a, a smaller diameter bore portion 84b coaxial with the larger diameter bore portion 84a, and a step 84c disposed and connecting between the larger and smaller diameter bore portions 84a and 84b. The piston 85 comprises a larger diameter portion 85a slidably fitted to the larger diameter bore portion 84a and a smaller diameter portion 85b slidably fitted to the smaller diameter bore portion 84b, which larger and smaller diameter portions 85a and 85b are connected together in a coaxial manner. The hydraulic brake pressure generating chamber 86 is defined between the larger diameter portion 85a of the piston 85 and the step 84c. The spring 87 is disposed under compression between the larger diameter portion 85a and the step 84c.

The first change-over valve part 81 is formed by slidably fitting a first spool valve body 89 into a first main body 88 which is integrally formed with the cylinder body 83 of the hydraulic brake pressure generating part 80. Further, the first main body 88 is formed with a cylinder bore 90 which extends parallel to the aforementioned cylinder bore 84 and the first spool valve body 89 is fitted slidably into the cylinder bore 90.

A hydraulic chamber 91 is defined between one end wall of the cylinder bore 90 and the first spool valve body 89 and a first hydraulic pressure source hydraulic chamber 92 is defined between the other end wall of the cylinder bore 90 and the first spool valve body 89. The hydraulic chamber 91 is communicated with the hydraulic brake pressure generating chamber 86 via a communication hole 93 and in this hydraulic chamber 91 is accommodated a spring 94 which urges the first spool valve body 89 in a direction to increase the volume of the hydraulic chamber 91.

The first main body 88 is formed with a hydraulic pressure supply port 95 which leads to the first hydraulic pressure source hydraulic chamber 92 and is communicated with the hydraulic pressure supply source S. Accordingly, the operation fluid is supplied from the hydraulic pressure supply source S into the first hydraulic pressure source hydraulic chamber 92 and a hydraulic force caused by the hydraulic pressure from the hydraulic pressure supply source S acts on the first spool valve body 89 in the leftward direction while the spring force of the spring 94 and the hydraulic force caused by the hydraulic pressure which is generated in the hydraulic brake pressure generating chamber 86 act on the valve body 89 in the rightward direction. When the hydraulic pressure supply source S is in normal operation, the first spool valve body 89 assumes a left-moved position, and if the hydraulic pressure supply source S fell in trouble and the hydraulic pressure in the first hydraulic pressure source hydraulic chamber 92 lowered, the first spool valve body 89 is displaced to the right.

On the outer surface of the first spool valve body 89 there are sequentially provided annular grooves 96, 97 and 98 in the mentioned order from the side of the hydraulic chamber 91 with spacings between respective grooves. On the other hand, on the inner surface of the cylinder bore 90 there are sequentially provided annular recessed portions 99, 100, 101 and 102 in the mentioned order from the side of the hydraulic chamber 91 with spacings therebetween. The first spool valve body 89 is formed with a communication passage 103 for communicating the hydraulic chamber 91 with the respective annular grooves 96 to 98. The annular recessed portions 99 to 102 are arranged such that when the first spool valve body 89 is at its right-moved position, the annular recessed portions 99, 100 and 101 are placed in communication with the hydraulic chamber 91, the annular groove 96 and the annular groove 97, respectively, whereas when the first spool valve body 89 is at its left-moved position, the annular recessed portion 102 is placed in communication with the annular groove 98.

The first valve body 88 is formed with a connection port 104 leading to the hydraulic chamber 91 and this connection port 104 is connected to the release port 7 for the modulators $1_{FL}$, $1_{FR}$ and $1_R$. The first valve body 88 is further provided with output ports 105, 106 and 107 and a release port 108 which lead to the annular recessed portions 99, 100, 101 and 102, respectively, wherein the output port 105 is communicated with the brake devices $B_{RL}$, $B_{RR}$; the output port 106 with the brake device $B_{FR}$; the output port 107 with the brake device $B_{FL}$; and the release port 108 with the hydraulic fluid tank T.

In the first change-over valve part 81 thus constructed, when the hydraulic pressure in the first hydraulic pressure source hydraulic chamber 92 assumes a high level during normal operation of the hydraulic pressure supply source S, the first spool valve body 89 is kept at the left-moved position shown in FIG. 6 and in this state, the hydraulic chamber 91, in other words, the release port 7 and the hydraulic brake pressure generating chamber 86, are communicated with the hydraulic fluid tank T. Once the hydraulic pressure within the first hydraulic pressure source hydraulic chamber 92 is lowered due to any failure in the hydraulic pressure supply source S or the like, the first spool valve body 89 is moved rightwardly to cut off the communication between the hydraulic chamber 91 and the hydraulic fluid tank T and in turn to bring the hydraulic brake pressure generating chamber 86 into communication with the respective output ports 105 to 107, that is, with the respective brake devices $B_{FL}$, $B_{FR}$, $B_{RL}$ and $B_{RR}$.

The second change-over valve part 82 is formed by slidably fitting a second spool valve body 111 into a second main body 112 and one of opposite end surfaces of the second spool valve body 111 is exposed to a reaction chamber 109 which is defined against an end surface of the piston 85 while the other end surface of the second spool valve body 111 is exposed to a second hydraulic pressure supply hydraulic chamber 110 leading to the hydraulic pressure supply source S.

The second main body 112 is integrally formed with the cylinder body 83 of the hydraulic brake pressure generating part 80 as well as with the first main body 88 of the first change-over valve part 81. In this second main body 112 is formed a cylinder bore 113 for slidably receiving the second spool valve body 111 and this cylinder bore 113 is formed coaxial with but larger in diameter than the smaller diameter bore portion 84b of the cylinder bore 84 in the hydraulic brake pressure generating part 80. The reaction chamber 109 is thus defined between one end surfaces of the piston 85 and the second spool valve body 111. The second hydraulic pressure source hydraulic chamber 110 is defined between the other end surface of the second spool valve body 111 and the second main body 112 and a communication hole 114 is formed to extend through the first main body 88 of the first change-over valve part 81 and the second main body 112 for connecting the first hydraulic pressure source hydraulic chamber 92 to the second hydraulic pressure source hydraulic chamber 110.

On the inner surface of the cylinder bore 113 are provided annular recessed portions 115 and 116 in the mentioned order from the reaction chamber 109 side with a spacing therebetween whereas an annular groove 117 is provided on the outer surface of the second spool valve body 111. A communication passage 118 is also formed in the second spool valve body 111 to provide a communication between the reaction chamber 109 and the annular groove 117. The second main body 112 is further formed with a connection port 119 which leads to the annular recessed portion 115 and is connected to the accumulator $A_2$. In addition, a passage 120 is provided to extend through the first and second main bodies 88 and 112 so as to connect two annular recessed portions 102 and 116.

In the second change-over valve part 82 having the above construction, when the hydraulic pressure sent from the hydraulic pressure supply source S is effective within the second hydraulic pressure source hydraulic chamber 110, the second spool valve body 111 stays at the left-moved position and in this state the annular groove 117 is in communication with the annular recessed portion 115 thus placing the reaction chamber 109 in communication with the accumulator $A_2$. If the hydraulic pressure given from the hydraulic pressure supply source S were reduced, the hydraulic pressure in the reaction chamber 109 causes the second spool valve body 111 to move to the right-hand position at which the annular groove 117 is communicated with the annular recessed portion 116. In consequence, the reaction chamber 109 is communicated with the hydraulic fluid tank T via the annular recessed portion 116, passage 120, annular recessed portion 102 and the release port 108.

An explanation will next be made about the operation of this third embodiment. Assuming first that the hydraulic pressure supply source S and the linear solenoid 11 operate normally and the brake pedal 32 is depressed to effect a braking operation. In this condition, in the auxiliary hydraulic pressure supply means 33', the hydraulic pressure from the hydraulic pressure supply source S acts in the first and second hydraulic pressure source hydraulic chambers 92 and 110 of the first and second change-over valve parts 81 and 82. Therefore, both the spool valve bodies 89 and 111 are displaced toward the left in FIG. 6 and the release port 7 and the hydraulic brake pressure generating chamber 86 are connected to the hydraulic fluid tank T via the hydraulic chamber 91, passage 103, annular groove 98, annular recessed portion 102 and the release port 108, whereas the reaction chamber 109 is connected to the accumulator $A_2$ via the communication passage 118, annular groove 117, annular recessed portion 115 and the connection port 119. As a consequence, an operator depresses the brake pedal 32 down to carry out the braking operation while receiving a reaction force from the accumulator $A_2$ and thus can have a brake operating feeling.

Since the amount of depression of the brake pedal 32 is detected by the load cell 39 (see FIG. 1) or the like and an electricity of the level corresponding to that depressed amount of the pedal is applied to the linear solenoid 11, the linear solenoid 11 exhibits a thrust corresponding to the amount of braking operation, whereby a hydraulic pressure of the level corresponding to the thrust, that is, a hydraulic pressure of the level corresponding to the amount of braking operation is generated in the hydraulic control pressure generating chambers 17 of the respective modulators $1_{FL}$, $1_{FR}$ and $1_R$ and such a hydraulic pressure acts in each of the hydraulic brake pressure chambers 4 of the brake devices $B_{FL}$, $B_{FR}$, $B_{RL}$ and $B_{RR}$. Thus, a braking force of the magnitude corresponding to the amount of braking operation can be obtained at the respective brake devices $B_{FL}$, $B_{FR}$, $B_{RL}$ and $B_{RR}$.

If the hydraulic pressure supply source S were is trouble and the level of hydraulic pressure obtained therefrom were reduced, it then becomes difficult to generate a hydraulic pressure in the hydraulic control pressure generating chamber 17 of each the modulators $1_{FL}$, $1_{FR}$ and $1_R$ and the spool 10 moves a maximum distance toward the hydraulic control pressure generating chamber 17 side to block the communication passage 27. On the other hand, in the auxiliary hydraulic pressure supply means 33', the hydraulic pressure in the first and second hydraulic pressure source hydraulic chambers 92 and 100 is lowered so that the spool valve bodies 89 and 111 in the first and second change-over valve parts 81 and 82 are displaced rightwardly in FIG. 6 to place the hydraulic brake pressure generating chamber 86 in communication with the respective output ports 105, 106 and 107 and hence, a hydraulic brake pressure which is produced in the hydraulic brake pressure generating chamber 86 in response to the brake pedal 32 being depressed, directly acts in each of the brake devices $B_{FL}$, $B_{FR}$, $B_{RL}$ and $B_{RR}$, thus providing a hydraulic brake pressure reliably irrespective of any problem in the hydraulic pressure supply source S.

Furthermore, upon a failure in the hydraulic pressure supply source S, the second spool valve body 111 of the second change-over valve part 82 in the auxiliary hydraulic pressure supply means 33' is displaced rightwardly and as a result, the reaction chamber 109 is shut off from the connection port 119 leading to the accumulator $A_2$ but is in turn brought into communication with the hydraulic fluid tank T, thereby avoiding generation of an ineffective operation stroke at the brake pedal 32.

Though, in this third embodiment, the cylinder body 83 of the hydraulic brake pressure generating part 80, the first main body 88 of the first change-over valve part 81 and the second main body 112 of the second change-over valve part 82 are formed into a unit structure, these components may be formed separately from one another and in this latter case a hydraulic chamber may be provided in communication with a reaction chamber which is formed facing an end surface of the piston 85 of the hydraulic brake pressure generating part 80 and one end portion of the second spool valve body 111 of the second change-over valve part 82 may be exposed to that hydraulic chamber.

Figure 7:
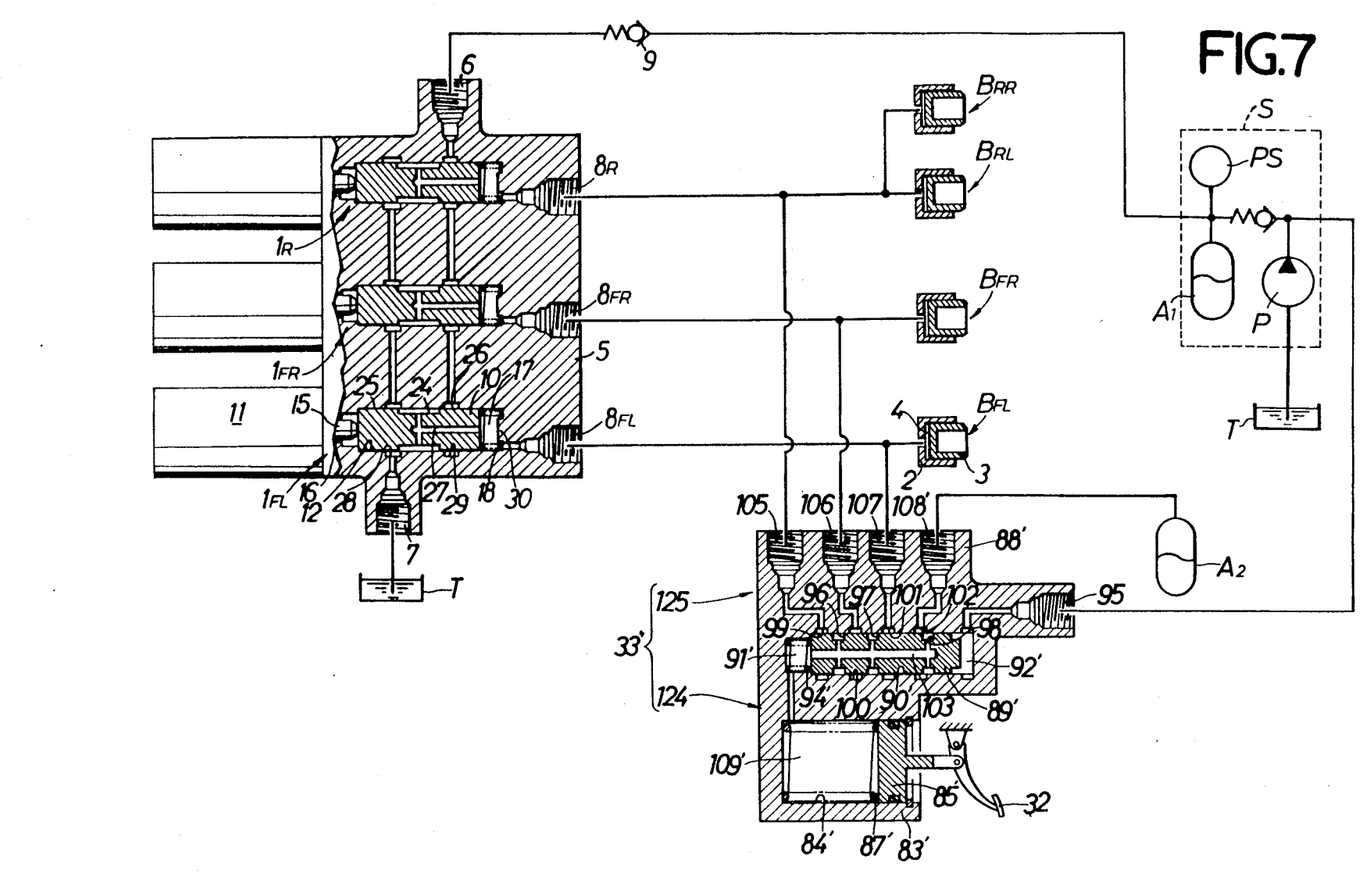

FIG. 7 shows a fourth embodiment according to the invention and parts corresponding to those of the foregoing embodiments are indicated by the same reference numerals and characters.

When the hydraulic pressure obtained from the hydraulic pressure supply source S were reduced to an abnormal level for any reasons and the modulators $11_{FL}$, $11_{FR}$ and $11_R$ could not operate in a normal condition, an auxiliary hydraulic pressure supply means 33'' operates to supply to the respective brake devices $B_{FL}$, $B_{FR}$, $B_{RL}$ and $B_{RR}$ a hydraulic brake pressure of such a level that corresponds to the amount of braking operation. This auxiliary hydraulic pressure supply means 33'' comprises a hydraulic brake pressure generating part 124 having a piston 85' which is coupled to the brake pedal 32 and is slidably fitted into a cylinder body 83' with one end surface of the piston 85' opposite the brake pedal 32 being exposed to a reaction chamber 109', and a change-over valve part 125 having a spool valve body 89' which is slidably fitted into a main body 88' and is exposed at one of opposite end surfaces thereof to a hydraulic chamber 91' leading to the reaction chamber 109' and at the other end surface to a hydraulic pressure source hydraulic chamber 92'.

More specifically, the hydraulic brake pressure generating part 124 is formed by slidably fitting the piston 85' into a cylinder bore 84' provided in the cylinder body 83'. The reaction chamber 109' is defined between the cylinder body 83' and the piston 85' on the side opposite the brake pedal 32 and a spring 87' is housed in this reaction chamber 109' for biassing the piston 85' in a direction to increase the volume of the chamber 109'.

The main body 88' of the change-over valve part 125 is integrally formed with the cylinder body 83' of the hydraulic brake pressure generating part 124 and this main body 88' is formed therein with a cylinder bore 90' which extends parallel to the cylinder bore 84' and slidably receives the spool valve body 89' therein.

A spring 94' is housed in the hydraulic chamber 91' defined between one end wall of the cylinder bore 90' and the spool valve body 89'.

On the outer surface of the spool valve body 89' there are provided annular grooves 96, 97 and 98 with spacings therebetween. On the inner surface of the cylinder bore 90' there are provided annular recessed portions 99, 100, 101 and 102 with spacings therebetween. The spool valve body 89' is further provided with a passage 103 for bringing the hydraulic chamber 91' into communication with the respective annular grooves 96 to 98.

The main body 88' is formed with output ports 105, 106 and 107 and a connection port 108' which lead to the annular recessed portions 99, 100, 101 and 102, respectively. The output port 105 is communicated with the brake devices $B_{RL}$ and $B_{RR}$; the output port 106 with the brake device $B_{FR}$; the output port 107 with the brake device $B_{FL}$; and the connection port 108' with the accumulator $A_2$.

In the change-over valve part 125 thus constructed, when the hydraulic pressure supply source S operates in normal condition and the hydraulic pressure in the hydraulic pressure source hydraulic chamber 92' is at a high level, the spool valve body 89' is held at the left-moved position shown in FIG. 7 and in this state the hydraulic chamber 91', that is, the reaction chamber 109', is in communication with the accumulator $A_2$. If the pressure level in the hydraulic pressure source hydraulic chamber 92' were reduced due to any problem in the hydraulic pressure supply source S or the like, the spool valve body 89' moves to the right to cut off the communication of the reaction chamber 109' and hydraulic chamber 91' with the accumulator $A_2$ and instead to communicate the reaction chamber 109' with the respective output ports 105 to 107, that is, with the respective brake devices $B_{FL}$, $B_{FR}$, $B_{RL}$ and $B_{RR}$.

Therefore, this fourth embodiment can offer the same advantages as obtained in the afore-mentioned third embodiment.

Though it is arranged in the above third and fourth embodiments that the hydraulic pressures in the hydraulic control pressure generating chambers 17 of the modulators $1_{FL}$, $1_{FR}$ and $1_R$ directly act in the respective brake devices $B_{FL}$, $B_{FR}$, $B_{RL}$ and $B_{RR}$, means for generating hydraulic brake pressure corresponding to the hydraulic pressures in the hydraulic control pressure generating chambers 17 may be interposed between the chambers 17 and the brake devices $B_{FL}$, $B_{FR}$, $B_{RL}$ and $B_{RR}$, respectively.

What is claimed is:

1. An electromagnetically operated control system comprising:
   an actuator means having an electromagnetic solenoid having a pair of coils which generate a force of a magnitude corresponding to an amount of electricity input to the electromagnetic solenoid; and
   a control circuit for controlling said amount of input electricity, said control circuit is constructed to be changed over between a plurality of stages, said control circuit including a half amount setting means for applying half of an amount of input electricity to each coil, respectively in one of the states, and an amount setting means for applying an entire amount of input electricity to an unfailed coil upon failure in either one of the coils in another of the states.

2. The electromagnetically operated control system as set forth in claim 1, wherein said actuator means comprises a spool slidably fitted in a housing with one of opposite end portions of the spool being operatively connected to said electromagnetic solenoid for receiving a thrust force from said solenoid of such a level as corresponding to said amount of input electricity and the other end portion of the spool being exposed to a hydraulic control pressure generating chamber which exhibits a hydraulic pressure counteracting said thrust force, said spool being movable in an axial direction between a hydraulic pressure supply position at which a hydraulic pressure supply source is communicated with said hydraulic control pressure generating chamber and a hydraulic pressure release position at which the hydraulic pressure in the hydraulic control pressure generating chamber is released outside, said actuator means being connected to a brake device for permitting a hydraulic brake pressure corresponding to the hydraulic pressure in said hydraulic control pressure generating chamber to act in said brake device.

3. The electromagnetically operated control system as set forth in claim 1, wherein said control circuit further comprises a first switch means for alternately connecting one of said amount setting means and said half amount setting means to the coils, problem diagnosing means for diagnosing a problem occurring in association with the coils, and a second switch means interposed between said first switch means and said respective coils and capable of cutting connection between said first switch means and either one of the coils upon detection of said problem occurring in association with said either one of the coils by said problem diagnosing means, said first switch means normally placing said half amount setting means in connection with said coils but permitting, upon detection of said problem in association with said either one of the coils, said amount setting means to be connected with the other of the coils through said second switch means.

4. The electromagnetically operated control system as set forth in claim 3, wherein said actuator means is used for generating a hydraulic braking force for braking a wheel of a vehicle and wherein said amount setting means and said half amount setting means operate in response to a braking action conducted by a driver of the vehicle such that said amount of input electricity corresponds to an extend of the braking action conducted by the driver.

* * * * *